(12) United States Patent
Briskey et al.

(10) Patent No.: US 11,428,293 B2
(45) Date of Patent: Aug. 30, 2022

(54) CLAMP FOR ENGAGING OBJECTS HAVING DIFFERENT EXTERIOR DIMENSIONS, AND A CABLE MANAGEMENT SYSTEM INCLUDING SUCH A CLAMP

(71) Applicant: PREFORMED LINE PRODUCTS CO., Mayfield Village, OH (US)

(72) Inventors: Ashley Elizabeth Briskey, Cleveland, OH (US); Daniel J. Levac, Gahanna, OH (US); Darnell Johnson, Willoughby Hills, OH (US); John Lee Jones, Independence, OH (US); Micheal Ma, Mayfield Heights, OH (US); Matthew Becker, University Heights, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 168 days.

(21) Appl. No.: 17/016,206

(22) Filed: Sep. 9, 2020

(65) Prior Publication Data

US 2021/0071737 A1 Mar. 11, 2021

Related U.S. Application Data

(60) Provisional application No. 62/897,951, filed on Sep. 9, 2019.

(51) Int. Cl.
*F16L 3/22* (2006.01)
*F16G 11/04* (2006.01)
(Continued)

(52) U.S. Cl.
CPC .......... *F16G 11/048* (2013.01); *G02B 6/4452* (2013.01); *G02B 6/4454* (2013.01); *H04Q 1/06* (2013.01)

(58) Field of Classification Search
CPC ... F16G 11/048; G02B 6/4452; G02B 6/4454; H04Q 1/06
(Continued)

(56) References Cited

U.S. PATENT DOCUMENTS 5,509,099 A 4/1996 Hermsen et al.
2006/0285811 A1 12/2006 Kowalczyk
(Continued)

OTHER PUBLICATIONS

Corresponding International Patent Application No. PCT/US2020/049995, International Preliminary Report on Patentability dated Mar. 9, 2022.
(Continued)

*Primary Examiner* — Todd M Epps
(74) *Attorney, Agent, or Firm* — Cooper Legal Group, LLC; William J. Cooper; David Resser

(57) ABSTRACT

A clamp, and cable management system including the clamp, includes a bolster with a first clamping surface, and a keeper that is to be coupled to the bolster. The keeper is adjustable relative to the bolster to establish a first separation of the keeper from the first clamping surface of the bolster, and a second separation of the keeper from the first clamping surface of the bolster. The first separation is different from the second separation. The keeper includes a second clamping surface configured to cooperate with a first object having a first exterior dimension, and a third clamping surface, different from the second clamping surface, that is configured to cooperate with a second object having a second exterior dimension.

20 Claims, 6 Drawing Sheets

(51) Int. Cl.
 *G02B 6/44* (2006.01)
 *H04Q 1/06* (2006.01)
(58) Field of Classification Search
 USPC ........................................................ 248/68.1
 See application file for complete search history.

(56) References Cited

U.S. PATENT DOCUMENTS

2014/0131527 A1   5/2014  Rudenick et al.
2021/0072480 A1*  3/2021  Briskey ............... G02B 6/4442

OTHER PUBLICATIONS

Corresponding International Patent Application No. PCT/US2020/049995, Written Opinion, dated Jan. 12, 2021.

* cited by examiner

CLAMP FOR ENGAGING OBJECTS HAVING DIFFERENT EXTERIOR DIMENSIONS, AND A CABLE MANAGEMENT SYSTEM INCLUDING SUCH A CLAMP

CROSS REFERENCE TO RELATED APPLICATIONS

This application claims priority to U.S. Provisional Patent Application No. 62/897,951, filed on Sep. 9, 2019, entitled "CLAMP FOR ENGAGING OBJECTS HAVING DIFFERENT EXTERIOR DIMENSIONS, AND A CABLE MANAGEMENT SYSTEM INCLUDING SUCH A CLAMP," which is hereby incorporated by reference herein.

TECHNICAL FIELD

The instant application is generally directed toward a clamp for engaging objects having different exterior dimensions, and a cable management system including such a clamp. For example, the clamp can include a keeper having a plurality of different clamping surfaces with different physical configurations to accommodate cables or other objects with different exterior dimensions.

BACKGROUND

Cables, such as fiber optic cables for example, are deployed to form a network of communication channels over which computers, telephones, electronic devices, etc. can communicate. To satisfy an ever-growing demand for such communication channels, fiber optic cables often include many individual fibers. An individual fiber from a first fiber optic cable can be selectively connected to another fiber included in a second fiber optic cable at a splice enclosure, which is commonly referred to as a "dome." The exterior dimensions and/or shapes of cables introduced to the housing will often vary per installation.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to some embodiments, a clamp for engaging objects having different exterior dimensions includes a bolster with a first clamping surface. A keeper is to be coupled to the bolster, and is adjustable relative to the bolster to establish a first separation of the keeper from the first clamping surface of the bolster, and a second separation of the keeper from the first clamping surface of the bolster. The first separation is different from the second separation. The keeper includes a second clamping surface configured to cooperate with a first object having a first exterior dimension, and a third clamping surface, different from the second clamping surface, that is configured to cooperate with a second object having a second exterior dimension.

According to some embodiments, the second clamping surface of the keeper is formed on a first face of the keeper, and the third clamping surface is formed on a second face of the keeper that is different from the first face.

According to some embodiments, the first face of the keeper and the second face of the keeper are on opposite sides of the keeper.

According to some embodiments, the keeper is separable from the bolster, to be adjusted between: a first installation in which the second clamping surface of the keeper opposes the first clamping surface of the bolster, and a second installation in which the third clamping surface of the keeper opposes the first clamping surface of the bolster.

According to some embodiments, the clamp includes a threaded fastener that releasably couples the keeper to the bolster, allowing separation of the keeper from the bolster to adjust the keeper between the first installation and the second installation.

According to some embodiments, the clamp includes an anti-slip surface provided to at least one of the first clamping surface, the second clamping surface, or the third clamping surface.

According to some embodiments, the anti-slip surface comprises a particulate coating.

According to some embodiments, the anti-slip surface comprises a network of projections with a valley between a first projection and a second projection.

According to some embodiments, the second clamping surface includes a first arcuate region having a first radius of curvature, and the third clamping surface includes a second arcuate region having a second radius of curvature. The first radius of curvature is different from the second radius of curvature.

According to some embodiments, the second clamping surface has a first cross-sectional shape, the third clamping surface has a second cross-sectional shape, and the first cross-sectional shape is different from the second cross-sectional shape.

According to some embodiments, a pedestal separates the bolster and the keeper from a platform.

According to some embodiments, a cable management system includes a cap that cooperates with a housing to enclose a connection between a first cable and a second cable. The cap defines a first port through which the first cable is extendable into the housing. A first clamp engages a portion of the first cable externally of the housing. The first clamp includes a bolster with a first clamping surface, and a keeper that is to be coupled to the bolster. The keeper is adjustable relative to the bolster to establish a first separation of the keeper from the first clamping surface of the bolster, and a second separation of the keeper from the first clamping surface of the bolster. The first separation is different from the second separation. The keeper includes a second clamping surface configured to cooperate with cables having exterior dimensions within a first range, and a third clamping surface configured to cooperate with cables having exterior dimensions within a second range. The second range is different from the first range.

According to some embodiments, the second clamping surface of the keeper is formed on a first face of the keeper, and the third clamping surface is formed on a second face of the keeper that is different from the first face.

According to some embodiments, the first face of the keeper and the second face of the keeper are on opposite sides of the keeper.

According to some embodiments, the keeper is separable from the bolster, to be adjusted between: a first installation in which the second clamping surface of the keeper opposes the first clamping surface of the bolster, and a second installation in which the third clamping surface of the keeper opposes the first clamping surface of the bolster.

According to some embodiments, an anti-slip surface is provided on at least one of the first clamping surface, the second clamping surface, or the third clamping surface.

According to some embodiments, the anti-slip surface includes a particulate coating.

According to some embodiments, the second clamping surface includes a first arcuate region having a first radius of curvature, and the third clamping surface includes a second arcuate region having a second radius of curvature. The first radius of curvature is different from the second radius of curvature.

According to some embodiments, the second clamping surface has a first cross-sectional shape, the third clamping surface has a second cross-sectional shape, and the first cross-sectional shape is different from the second cross-sectional shape.

According to some embodiments, a clamp engages objects having different exterior dimensions. The clamp includes a bolster with a first clamping surface that has a first arcuate region having a first radius of curvature. A keeper is to be coupled to the bolster by a releasable fastener, and is adjustable through manipulation of the releasable fastener to establish a variable distance separating the keeper from the first clamping surface. The keeper includes: a second clamping surface with a second arcuate region that has a second radius of curvature, and is configured to extend at least partially about objects having an exterior dimension within a first range; and a third clamping surface with a third arcuate region that has a third radius of curvature, different from the second radius of curvature, and is configured to extend at least partially about objects having an exterior dimension within a second range. At least one of the first arcuate region, the second arcuate region, or the third arcuate region includes an anti-slip surface.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
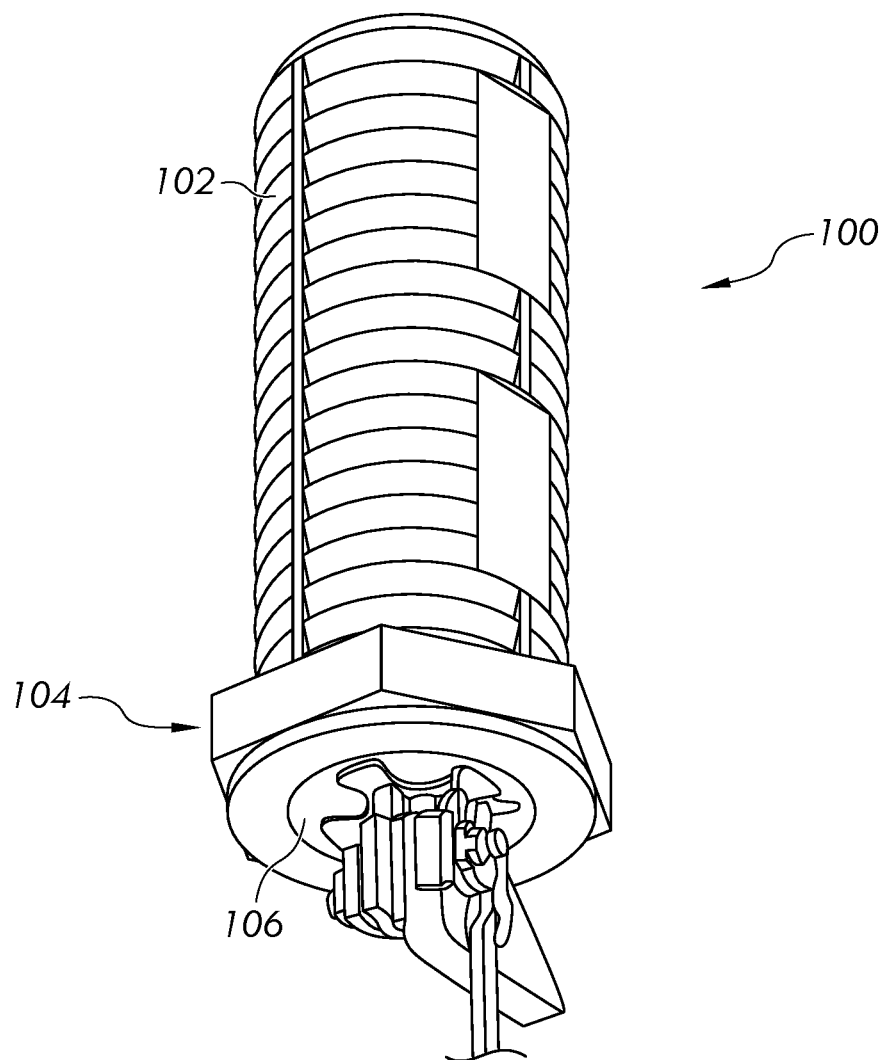
FIG. 1 is a perspective view of an embodiment of a splice enclosure including a cable management system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Objects such as fiber optic cables, for example, to be held within a clamp have a variety of different exterior dimensions. For example, the diameter of fiber optic cables can fall within a first range from about one third (⅓ in.) of an inch, to about three quarters (¾ in.) of an inch. Some embodiments of a clamp are configured to accommodate this range of diameters.

However, as the number of fibers included in fiber optic cables increases, at least one exterior dimension, such as the diameter of the fiber optic cables is also expected to increase. For example, relatively-large fiber optic cables can have an outside diameter within a range from about three quarters (¾ in.) of an inch, to about one and a half (1.5 in.) inches. Such relatively-large fiber optic cables may not be properly accommodated by a clamp configured to accommodate the first range of diameters.

Instead of requiring the installation of different clamps to accommodate the cables with diameters falling in the different ranges, embodiments of the clamp are adjustable to accommodate cables having different exterior dimensions. According to some embodiments, the clamp can be adjusted to clamp objects having different external dimensions. For example, cables having generally-circular cross sectional shapes, but different diameters falling in different ranges can be properly accommodated as a result of adjusting a keeper forming a portion of the clamp.

According to some embodiments, the clamp can be adjusted to clamp objects having different cross-sectional shapes. For example, a first object can have a rectangular cross-sectional shape, and a second object can have a circular cross-sectional shape. Embodiments of the clamp can properly accommodate the first object and the second object as a result of adjusting a keeper forming a portion of the clamp.

The description that follows describes embodiments of a clamp that is adjustable to engage cables, such as fiber optic cables, for example, having different outside diameters as the different exterior dimensions. The exemplary embodiments of the clamp are described herein as clamping the cables externally of a splice enclosure in which a connection between a portion of a first fiber optic cable and a portion of a second fiber optic cable is enclosed. Such examples are described herein for purposes of clarity and brevity. The present disclosure is not limited to such exemplary embodiments. Embodiments of the clamp can be adjustable to engage any object, having any different external dimensions such as different outside dimensions, different cross-sectional shapes, etc. for which the different clamping surfaces are configured.

A splice enclosure includes a housing defining an interior space in which a connection between a first cable and a second cable is to be supported. A cap encloses the interior space and includes a first port through which the first cable enters the interior space and a second portion through which the second cable enters the interior space. Because the orientation and location of splice enclosures vary by application, the first and second cables can be subjected to forces that may affect the connection between the first and second cables.

A cable management system includes a clamp, some embodiments of which are described herein, to at least partially mitigate the forces impacting the connection. Some embodiments of the clamp include a keeper that is adjustable relative to a bolster to exert a compressive force on an object engaged by the clamp between the bolster and the keeper. The compressive force maintains the cable in place relative to the bolster and the keeper, and couples the cable to a structure such as a cable management system to maintain an orientation and position of a cable adjacent to the cap, where the cable enters a splice enclosure. Thus, external forces exerted on the cable can be, in part, isolated from the connection supported within the housing.

To provide flexibility in the types and sizes of cables that can be supported, the keeper includes at least a first clamping surface and a second clamping surface. The first clamping surface and the second clamping surface are configured differently, to accommodate cables or other objects of different diameters, different cross-sectional shapes, etc.

For example, some embodiments of the first clamping surface include an arcuate region formed on a first face of the keeper. The arcuate region can include a radius of curvature suitable to allow the first clamping surface to extend at least partially about an exterior periphery of a first cable. Some embodiments of the second clamping surface include an arcuate region formed on a second face of the keeper. The first face and the second face of the keeper can be arranged on different, or opposite, sides of the keeper, or otherwise positioned on the keeper to allow adjustment of the keeper relative to the bolster to cause the cable to be clamped between the bolster and the first face or second face, as appropriate, depending on the external dimension(s) of the cable.

According to some embodiments, a clamping surface provided to the bolster or one or more clamping surfaces provided to the keeper can include an anti-slip surface. For example, grit, or a network of first and second projections defining a valley defined there between, can be provided to the clamping surface(s) to limit slippage of the cable when engaged by the clamp.

Some embodiments of the clamp protrude from a surface of a cap forming a portion of the cable management system. For such embodiments, a pedestal protrudes away from a platform that is configured to be coupled to the cap. Thus, the bolster and the keeper can be spaced apart from the cap, to support a region of a cable extending into the housing, at a location externally of the housing.

Referring now to the drawings, FIG. 1 is a perspective view of an embodiment of a splice enclosure 100. The illustrated embodiment of the splice enclosure includes a housing 102 that defines an interior space in which a connection between at least a first cable 202 (FIG. 2) and a second cable 204 (FIG. 2) is to be enclosed. The housing 102 is formed from any suitably-durable material that can withstand the environmental conditions where the splice enclosure 100 is to be installed. An example of a material for the housing 102 includes, but is not limited to, plastics such as ultraviolet-resistant, thermosetting polymers, and the like.

A cable management system 104 encloses an opening formed in the housing 102, leading into the interior space. Embodiments of the cable management system 104 include a cap 106 that cooperates with the opening formed in the housing 102 leading into the interior space. Some embodiments of the cap 106 include a compressible gasket 206 (FIG. 2), facilitating the formation of an air-tight enclosure as a result of cooperation between the housing 102 and the cap 106.

Figure 8:
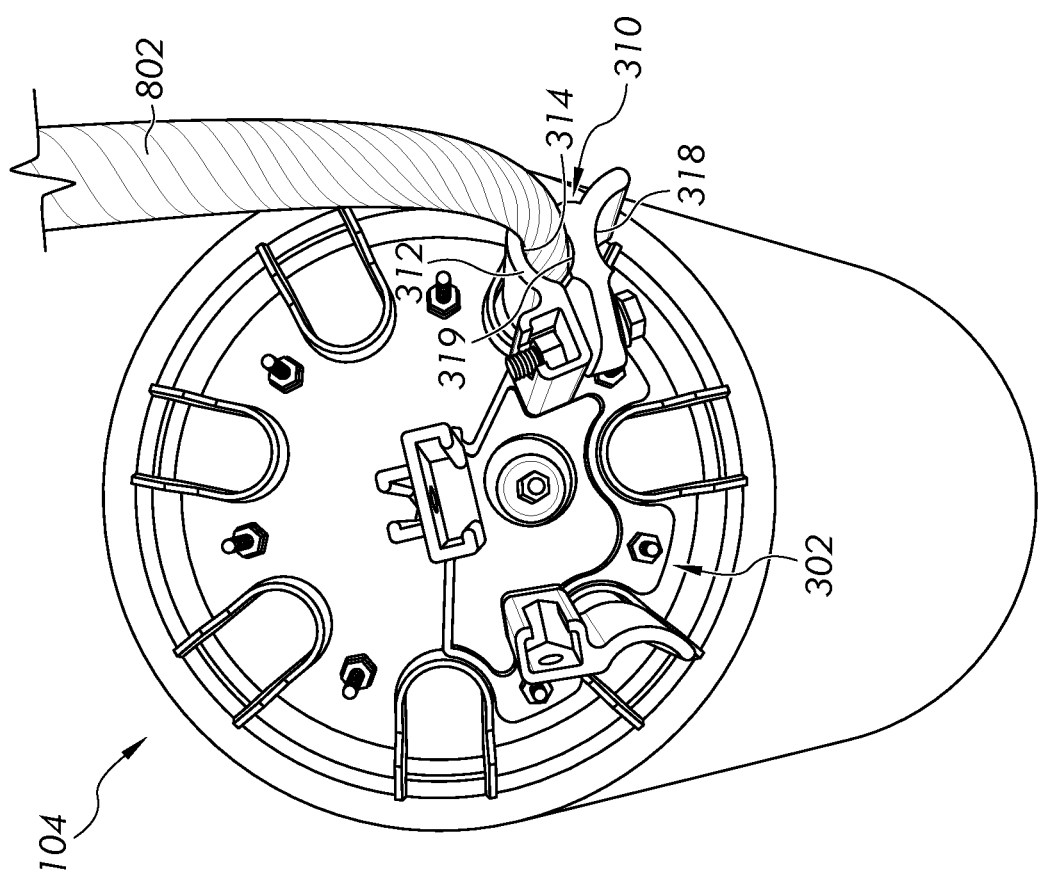
FIG. 8 is a top view of a cable management system in a condition of use, and including a clamp with an adjustable keeper maintaining an alignment of optical ground wire relative to ports in a cap.

The first cable 202 and the second cable 204 are shown in the drawings as fiber optic cables within a flexible, dielectric jacket. However, according to some embodiments, the cable management system 104 and clamp 310 (FIG. 3) are configured to maintain an alignment of optical ground wire "OPGW" cables 802 introduced to the housing 102 relative to ports, as shown in FIG. 8. The OPGW cables 802 include one or more optical fibers within a tubular jacket, which is surrounded by one or more layers of conductive wire helically wound about the tubular jacket. The OPGW cables 802 extend between towers supporting electrical power lines, and connect the towers to earth ground. For the sake of brevity and clarity, however, fiber optic embodiment of the first cable 202 and the second cable 204 are used to describe the cable management system 104 and clamp 310.

Figure 2:
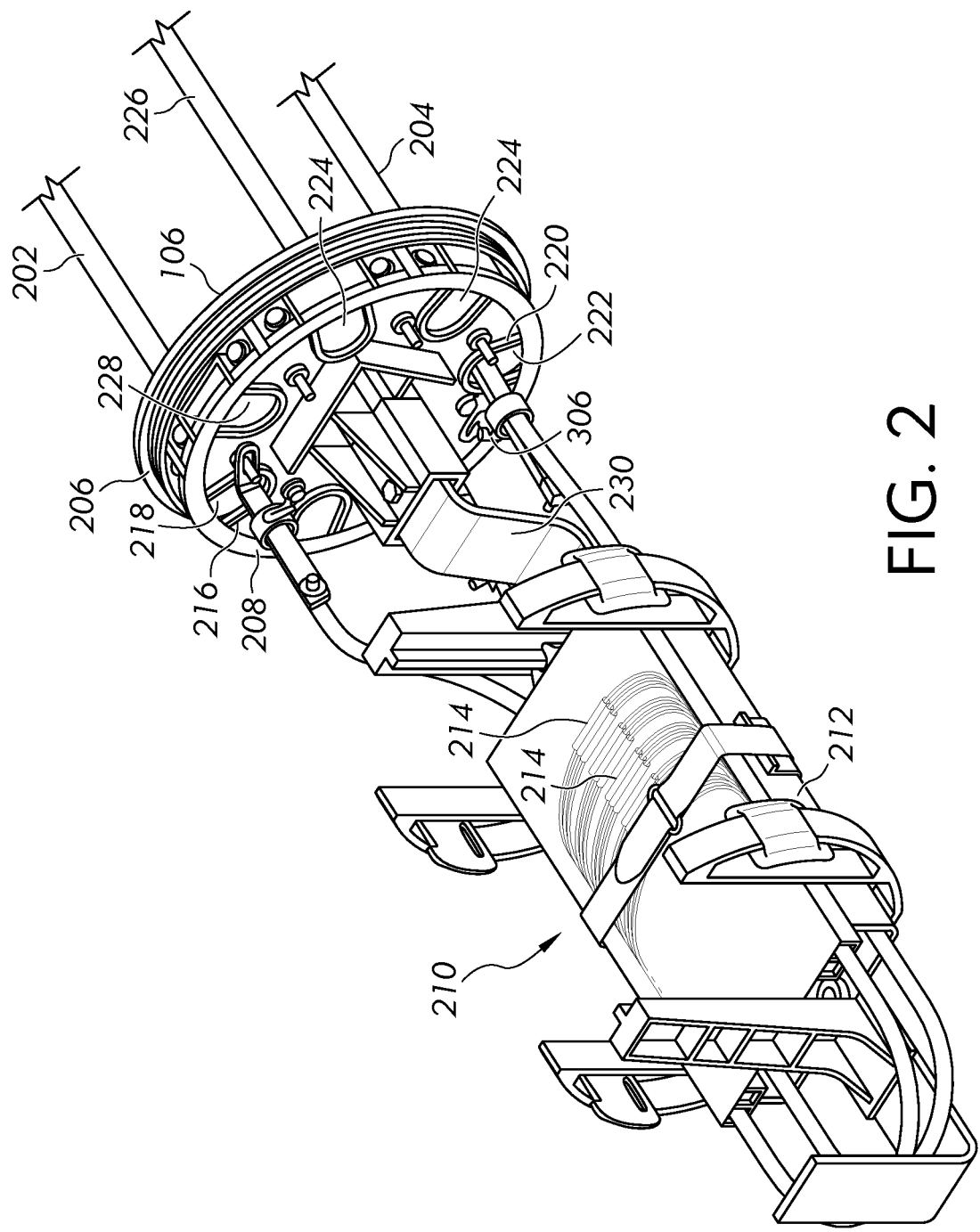
FIG. 2 is a cutaway view showing an organizer that supports a connection between an optical fiber of a first cable and an optical fiber of a second cable, the organizer being coupled to a cable management system that is to be installed on a housing of a splice enclosure.

FIG. 2 is a perspective view of an internal side 208 of the cap 106, coupled to an organizer 210 that supports a connection between the first cable 202 and the second cable 204. While the splice enclosure 100 is assembled, the internal side 208 of the cap 106 faces inwardly, into the interior space defined by the housing 102, where the organizer 210 is supported.

Some embodiments of the organizer 210 include a tray 212 with a plurality of splice grooves 214. The splice grooves 214 include apertures that receive an individual fiber included in the first cable 202 and an individual fiber included in the second cable 204. A connection is established between the individual fibers from the first and second cables 202, 204 received within the respective aperture, allowing fiber optic light signals to be conveyed between the connected fibers.

Some embodiments of the cap 106 include a plurality of ports through which at least the first cable 202 and the second cable 204 extend into the interior space of the housing 102. For the illustrated embodiment of FIG. 2, a first port 216 is defined by the cap 106, forming an aperture through which the first cable 202, or a portion thereof, extends into the interior space of the housing 102. An elastically-compressible grommet 218 forms a seal around the first cable 202 within the first port 216. A second port 220 is defined by the cap 106, forming an aperture through which the second cable 204, or a portion thereof, extends into the interior space of the housing 102. A compressible grommet 222 forms a seal around the second cable 204 within the second port 220.

Some embodiments of the cap 106 also include one or more (e.g., up to eight, or up to six, or up to five, or up to four, etc.) expansion ports 224, corresponding to expansion locations through which at least a third cable 226 extends into the interior space defined by the housing 102. For example, one or more individual fibers included in the third cable 226 is/are configured to be received within a splice groove 214 to establish a connection with one or more fibers of the first cable 202 or the second cable 204. For some embodiments, such as the embodiment illustrated in FIG. 3, there are seven (7) total ports 216, 220, 224.

When not in use, the expansion ports 224 are closed by stoppers 228 according to some embodiments. The stopper 228 for the individual expansion port is cut away, or otherwise removed from the cap 106, as needed, at a time when the third cable 226, for example, is to be introduced to the interior space defined by the housing 102.

Figure 3:
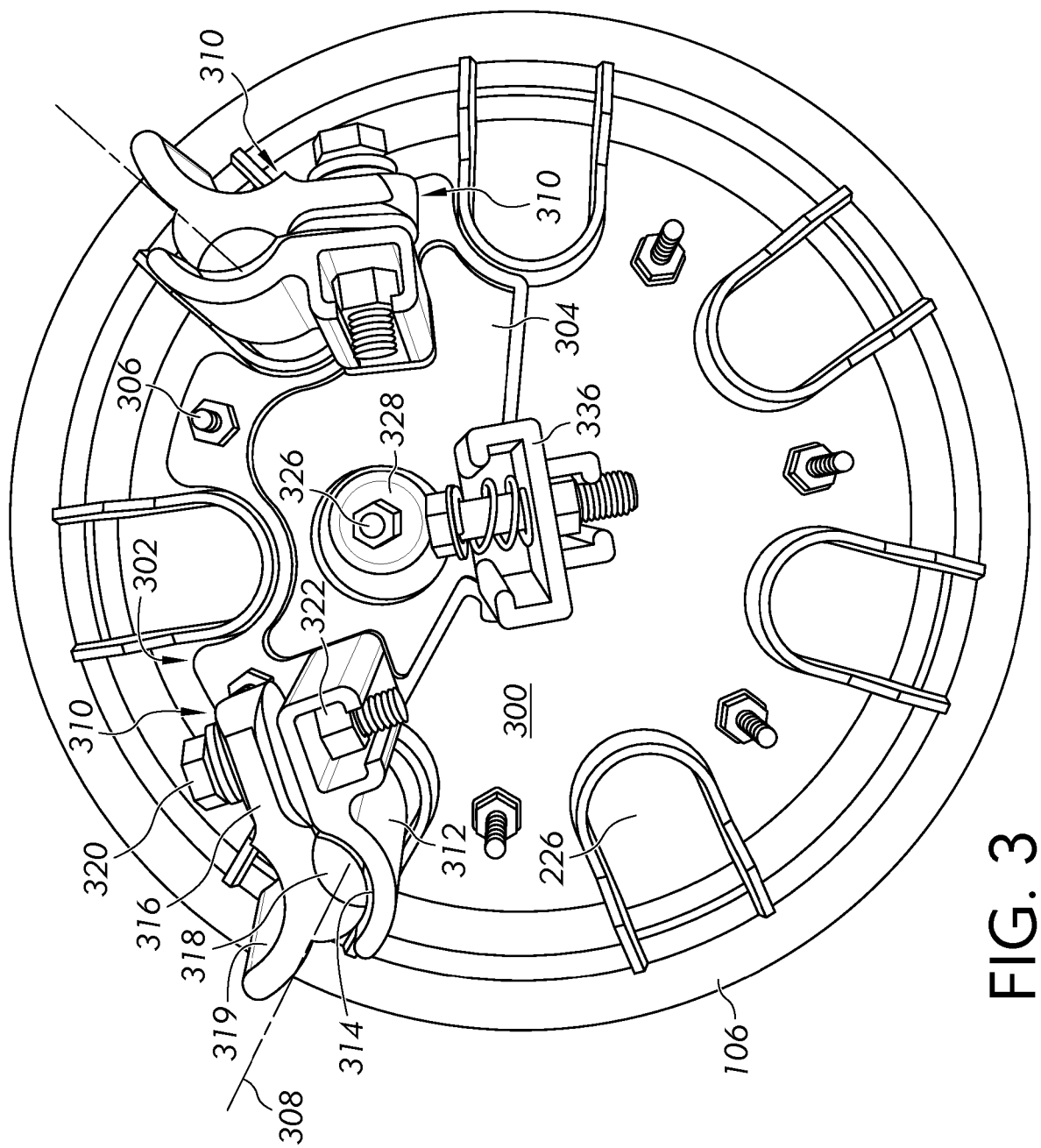
FIG. 3 is a top view of a cap for a cable management system including a plurality of clamps that are configurable to engage objects having different exterior dimensions.

FIG. 3 is a top view of an outward-facing surface 300 of an embodiment of the cap 106. According to some embodiments, a base 302 is to be coupled to the outward-facing surface 300 of the cap 106. Embodiments of the base 302 include a platform 304 fabricated from a metal, metal alloy, or other suitably-rigid material to support the weight of the splice enclosure 100 according to some embodiments, however, the base 302 can be formed from other materials without departing from the scope of the present disclosure.

At least one, or a plurality of fasteners 306 engage(s) the platform 304 and the outward-facing surface 300 of the cap 106, to couple the platform 304 to the cap 106. As shown in FIG. 2, one or a plurality of the fasteners 306 can engage the organizer 210, or a support structure 230 extending between the organizer 210 and the cap 106, to couple the organizer 210 to the cap 106. According to some embodiments, coupling the organizer 210 to the cap may block one, or a plurality of the expansion ports 224. For such embodiments, the number of usable ports is given as:

$$UP = TP - BP$$

Where UP is the number of usable ports, through which a portion of a cable can be extended into the interior space defined by the housing 102; TP is the total number of ports 216, 220, 224 physically present on the cap 106, whether blocked by stoppers 228 or opened; and BP is the number of blocked ports through which access to the interior space defined by the housing 102 is blocked by the organizer 210 or support structure 230.

The embodiment of the base 302 shown in FIG. 3 includes at least a clamp 310. However, some embodiments of the base 302 include a plurality of the clamp 310.

According to some embodiments, the base 302 includes a mounting bracket 336. The mounting bracket 336 engages a frame member that couples the splice enclosure 100 to a fixture such as a utility pole or tower, a building, or other structure, for example, where the splice enclosure 100 is to be installed. The mounting bracket 336 can be formed as a portion of the base 302 that is to be located at a central region of the cap 106 when the base 302 is installed on the cap 106.

Some embodiments of the cap 106 include a valve 326. The valve is operable to allow a compressed gas such as air, or an inert gas, for example, to be inserted into the interior space defined by the housing 102. As mentioned above, embodiments of the splice enclosure 100 are airtight. The compressed gas is introduced into the interior space defined by the housing 102 through the valve 326 to test the integrity of the seal between the cap 106 and the housing 102. Some embodiments of the platform 304 forming a portion of the base 302 include an aperture 328. The valve 326 is accessible through the aperture 328 formed in the platform 304, while the base 302 is installed on the cap 106. In other words, the gas is to be introduced into the housing 102, and exhausted from the interior space defined by the housing 102 through the valve 326 without requiring the base 302 to be removed from, or adjusted on the cap 106.

Figure 5:
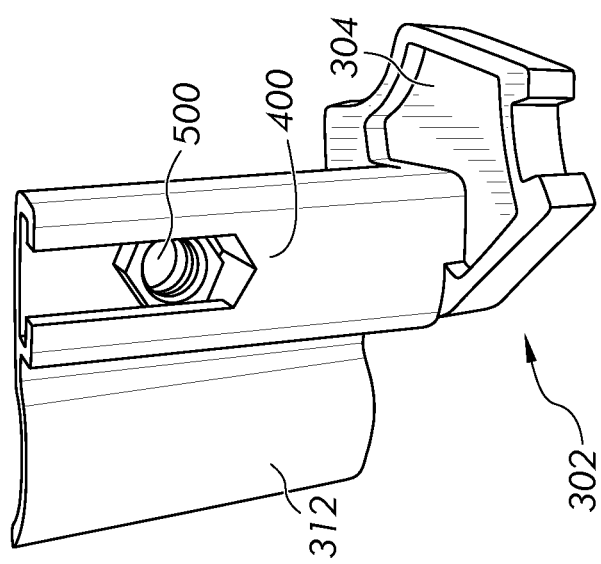
FIG. 5 is a perspective view of an embodiment of a base including a bolster supported by a pedestal protruding from a platform.

According to some embodiments, the clamp 310 is supported by a platform 304 that supports a single first clamp, as shown in FIG. 5. The platform 304 shown in the embodiment of FIG. 5 lacks the aperture 328 of the platform 304 of the embodiment of the base 302 shown in FIG. 3.

Referring once again to FIG. 3, according to some embodiments, embodiments of the clamp 310 protrude upward from a surface of the platform 304 provided to the base 302. A pedestal 400 (FIGS. 4 and 5) extends upwardly, generally away from a top surface of the platform 304, in a direction away from the housing 102 while the cap 106 is installed on the housing 102. The pedestal spaces the clamp 310 from the platform 304, allowing the clamp 310 to support a region of the cable at a location spaced apart from the cap 106. The clamp 310 maintains an alignment of a portion of the first cable 202 with an axis 308. Some embodiments of the axis 308 are perpendicular to a plane within which the first port 216 is defined by the cap 106. Some embodiments of the axis 308 are oblique or non-perpendicular to a plane within which the first port 216 is defined by the cap 106. For some embodiments, the axis 308 is a longitudinal axis of the first cable 202, which can be orthogonal to a major surface of the cap 106. According to some embodiments, the axis 308 along which the first cable 202 is maintained is substantially parallel to a longitudinal axis of the housing 102 (e.g., forms an acute angle relative to the longitudinal axis of the housing 102, or forms an angle that is within ±10 degrees of the longitudinal axis of the housing 102).

The clamp 310 is a locking structure that is to engage the first cable 202, thereby maintaining the alignment of the portion of the first cable 202 retained by the clamp 310 with the axis 308. According to some embodiments, the clamp 310 includes a bolster 312. Embodiments of the bolster 312 are integrally formed as a monolithic structure as part of the pedestal 400 and the platform 304. The bolster 312 can be a stationary surface relative to the platform 304 or the pedestal 400, and forms a first clamping surface 314 against which the portion of the first cable 202 engaged by the clamp is compressed.

Figure 4:
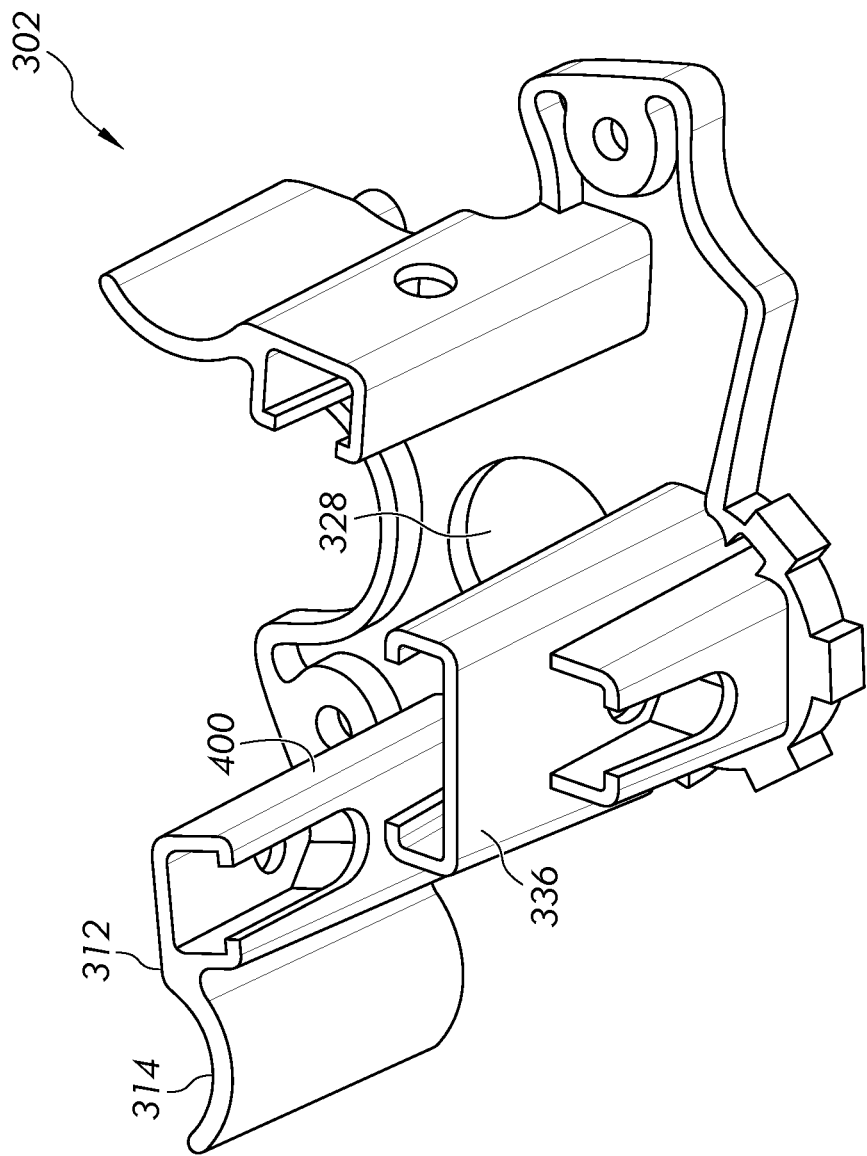
FIG. 4 is a perspective view of an embodiment of a base including a bolster supported by a pedestal protruding from a platform.

The embodiment of the bolster 312 shown in FIGS. 3 and 4 includes a clamping surface 314 with an arcuate region forming a recess into which the first cable 202 is to be secured. For example, the arcuate region of the first clamping surface 314 has a radius of curvature that is comparable to a curvature of the first cable 202, to receive the first cable 202. According to some embodiments, the radius of curvature of the arcuate region can be selected to accommodate a largest diameter of the first cable 202 that the clamp 310 is expected, or designed to engage. According to some embodiments, the radius of curvature of the arcuate region can be suitable to allow the arcuate region of the first clamping surface 314 to receive an embodiment of the first cable 202 having a diameter within a range of diameters up to about two (2 in.), or up to one and a half (1.5 in.) inches, etc., while being fully seated within the arcuate region. To be fully seated, a portion of the first cable 202 is in contact with a bottom of the arcuate region, when the arcuate region is oriented to be viewed as having a generally U-shape.

A keeper 316 is adjustably coupled to the bolster 312 of the clamp 310. According to some embodiments, the keeper 316 is adjustably coupled to the bolster 312 by a fastener 320 that is releasable. For the embodiment shown in FIG. 3, the fastener 320 includes an externally-threaded bolt that extends through an aperture 500 (FIG. 5) formed in the pedestal 400, and an aperture 600 (FIG. 6) formed in the keeper 316. A locking member 322 (FIG. 3) such as an internally-threaded nut, for example, is threaded onto a protruding region of the bolt extending beyond the aperture 500 in the pedestal 400. Cooperation in one direction (e.g., clockwise) between the threading provided to the nut and bolt urges the keeper 316 toward the bolster 312, and cooperation in the opposite direction (e.g., counter clockwise) between the threading provided to the nut and bolt allows the keeper 316 to separate from the bolster 312. Removal of the bolt from the nut allows the keeper 316 to be fully separable from the bolster 312, and the clamp 310. Thus, the keeper 316 is adjustable relative to the bolster 312 to establish a first separation of the keeper 316 from the clamping surface 314 of the bolster 312, and a second separation of the keeper 316 from the clamping surface 314 of the bolster 312, where the first separation is different from the second separation. Such adjustability varies the distance separating the keeper from the clamping surface 314, to engage objects having a range of different exterior dimensions.

Figure 6:
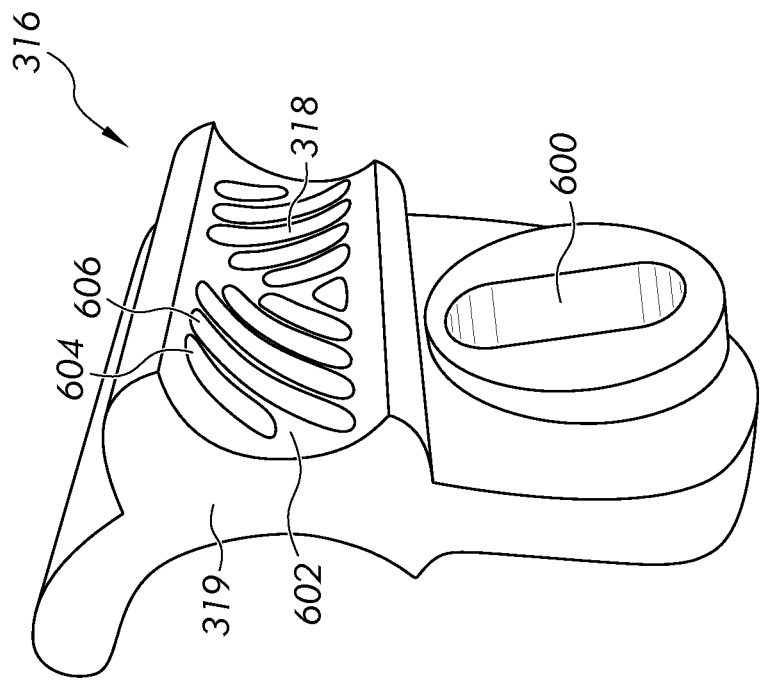
FIG. 6 is a perspective view of a keeper having a plurality of different clamping surfaces for engaging objects having different exterior dimensions.

According to some embodiments, the keeper 316 includes a plurality of clamping surfaces, such as clamping surface 318, and clamping surface 319, as shown in FIGS. 3 and 6. The clamping surface 318 is configured to cooperate with the first cable 202 or other object having an exterior dimension falling within a first range of exterior dimensions. For example, the clamping surface 318 can include an arcuate region having a radius of curvature that is suitable to allow a cable having a diameter up to a limit of about three quarters (¾ in.) of an inch to be fully seated within the arcuate region.

The clamping surface 319 is configured differently than the clamping surface 318. According to some embodiments, the clamping surface 319 is configured to cooperate with a different cable or other object having an exterior dimension that exceeds the first range of exterior dimensions that the clamping surface 318 properly engages. For example, the clamping surface 319 can include an arcuate region having a radius of curvature that is suitable to allow a cable having a diameter from about three quarters (¾ in.) of an inch, up to about two (2 in.) inches, or up to about one and a half (1.5 in.) inches to be fully seated within the arcuate region. According to some embodiments, the arcuate region of the clamping surface 318 or the arcuate region of the clamping surface 319 can have a radius of curvature that is approximately the same as the radius of curvature of the clamping surface 314 of the bolster 312.

According to some embodiments, at least one of the clamping surface 314 of the bolster 312, the first clamping surface 318 of the keeper 316, or the second clamping surface 319 of the keeper 316 can have a region in a shape other than arcuate. For example, at least one of the clamping surface 314 of the bolster 312, the first clamping surface 318 of the keeper 316, or the second clamping surface 319 of the keeper 316 can have a region with a substantially V-shaped cross section, to engage objects having a rectangular exterior dimension. For the sake of brevity and clarity, however, embodiments including the arcuate shaped region are described.

According to some embodiments, the clamping surface 318 and the clamping surface 319 can be arranged at different faces of the keeper 316. For example, as shown in FIG. 6, the clamping surface 318 and the clamping surface 319 are formed on opposite sides of the keeper 316. According to some embodiments, the keeper 316 can include three or more facets including clamping surfaces configured differently to accommodate objects having different external dimensions. According to some embodiments, the clamping surface 318 and the clamping surface 319 are arranged at a common face, to concurrently oppose the bolster 312 while the keeper 316 is installed on the clamp 310. For such embodiments, the fastener 320 can allow linear adjustment of the position of the keeper 316 to cause one of the clamping surface 318 and the clamping surface 319 to oppose the clamping surface 314 of the bolster at a time, depending on the external dimension of the object to be clamped between the keeper 316 and the bolster 312. For the sake of brevity and clarity, however, adjustment of the embodiment of the keeper 316 with the clamping surface 318 and the clamping surface 319 on opposite sides of the keeper 316 is described herein.

Figure 7:
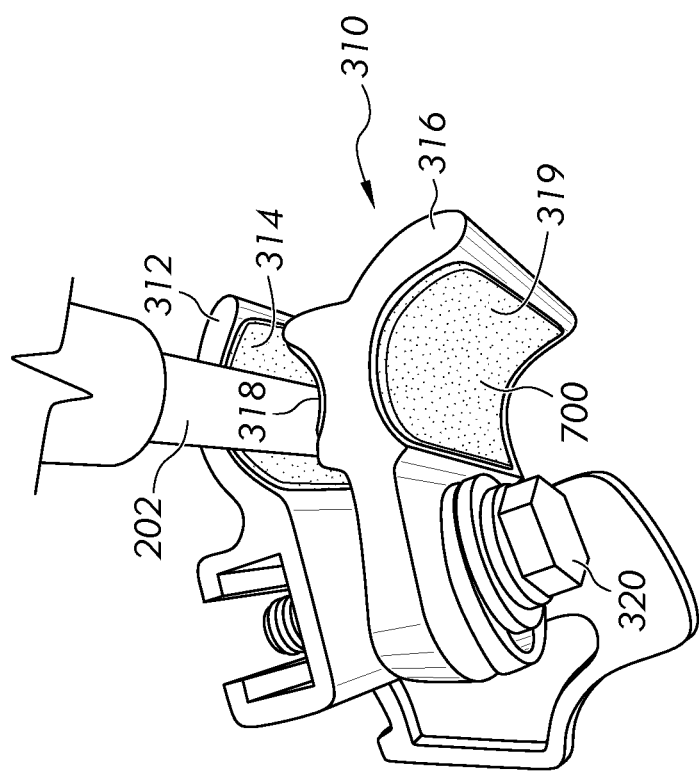
FIG. 7 is a perspective view of a clamp engaged with a cable, the clamp including a keeper having a plurality of different clamping surfaces for engaging objects having different exterior dimensions.

According to some embodiments, at least one of the clamping surface 314, the clamping surface 318, and the clamping surface 319 is provided with an anti-slip surface. For example, the embodiment shown in FIG. 6 includes a network of projections, with a valley 602 defined between a first projection 604 and a second projection 606. According to some embodiments, the anti-slip surface can include a particulate coating 700, as shown in FIG. 7. The particulate coating 700 includes granules of a rigid material adhere to, or formed as part of the clamping surface 314, the clamping surface 318, or the clamping surface 319.

In use, some embodiments of the clamp 310 are installed on a cap 106 forming a portion of a cable management system 104 for a splice enclosure 100. One or more fasteners 306 engage(s) the platform 304 and the outward-facing surface 300 of the cap 106, to couple the platform 304 to the cap 106. The first cable 202 is arranged adjacent to the clamping surface 314 of the bolster 312, as shown in FIG. 7.

The keeper 316 is oriented with the clamping surface 318 or the clamping surface 319, suitable for the exterior dimension of the first cable 202, opposing the clamping surface 314 of the bolster 312, with the first cable 202 disposed there between. In the embodiment appearing in FIG. 7, the keeper 316 is oriented so the clamping surface 318 opposes the clamping surface 314, and the clamping surface 319 faces away from the clamping surface 314 of the bolster 312.

The fastener 320 extends through the aperture 600 defined by the keeper 316, and the aperture 500 defined by the pedestal 400, coupling the properly-oriented keeper 316 to the bolster 312. The nut or other locking member 322 is installed on the fastener 320 on an opposite side of the pedestal relative to the side of the pedestal where the fastener 320 was introduced. Adjustment of the fastener 320 and/or locking member 322 relative to the other urges the clamping surface 318 of the keeper 316 toward the clamping surface 314 of the bolster 312, securing the first cable 202 there between.

To couple the clamp 310 to a cable 802 (shown as an OPGW cable in FIG. 8) having an exterior dimension that exceeds the range of compatible dimensions for the clamping surface 318, the keeper 316 in FIG. 7 is flipped, to the orientation shown in FIG. 8. The clamping surface 319 of the keeper 316 opposes the clamping surface 314 of the bolster 312 with the keeper 316 in such an orientation, and the clamping surface 318 faces away from the cable 802. The fastener 320 can be installed as described above, to secure the relatively-large cable 802 between the clamping surface 314 of the bolster 312 and the clamping surface 319 of the keeper 316.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A clamp for engaging objects having different exterior dimensions, the clamp comprising:
   a bolster comprising a first clamping surface; and
   a keeper that is to be coupled to the bolster, and is adjustable relative to the bolster to establish a first separation of the keeper from the first clamping surface of the bolster, and a second separation of the keeper from the first clamping surface of the bolster, the first separation being different from the second separation, wherein the keeper comprises:
   a second clamping surface configured to cooperate with a first object having a first exterior dimension, and
   a third clamping surface, different from the second clamping surface, that is configured to cooperate with a second object having a second exterior dimension.

2. The clamp of claim 1, wherein the second clamping surface of the keeper is formed on a first face of the keeper, and the third clamping surface is formed on a second face of the keeper that is different from the first face.

3. The clamp of claim 2, wherein the first face of the keeper and the second face of the keeper are on opposite sides of the keeper.

4. The clamp of claim 1, wherein the keeper is separable from the bolster, to be adjusted between:
   a first installation in which the second clamping surface of the keeper opposes the first clamping surface of the bolster, and
   a second installation in which the third clamping surface of the keeper opposes the first clamping surface of the bolster.

5. The clamp of claim 4, comprising a threaded fastener that releasably couples the keeper to the bolster, and allows separation of the keeper from the bolster to adjust the keeper between the first installation and the second installation.

6. The clamp of claim 1, comprising an anti-slip surface provided to at least one of the first clamping surface, the second clamping surface, or the third clamping surface.

7. The clamp of claim 6, wherein the anti-slip surface comprises a particulate coating.

8. The clamp of claim 6, wherein the anti-slip surface comprises a network of projections with a valley between a first projection and a second projection.

9. The clamp of claim 1, wherein the second clamping surface comprises a first arcuate region having a first radius of curvature, and the third clamping surface comprises a second arcuate region having a second radius of curvature, and wherein the first radius of curvature is different from the second radius of curvature.

10. The clamp of claim 1, wherein the second clamping surface has a first cross-sectional shape, the third clamping surface has a second cross-sectional shape, and the first cross-sectional shape is different from the second cross-sectional shape.

11. The clamp of claim 1, comprising a pedestal that separates the bolster and the keeper from a platform.

12. A cable management system comprising:
   a cap that cooperates with a housing to enclose a connection between a first cable and a second cable, wherein the cap defines a first port through which the first cable is extendable into the housing; and
   a first clamp for engaging a portion of the first cable externally of the housing, the first clamp comprising:
   a bolster comprising a first clamping surface; and
   a keeper that is to be coupled to the bolster, and is adjustable relative to the bolster to establish a first separation of the keeper from the first clamping surface of the bolster, and a second separation of the keeper from the first clamping surface of the bolster, the first separation being different from the second separation, wherein the keeper comprises:
   a second clamping surface configured to cooperate with cables having exterior dimensions within a first range, and
   a third clamping surface configured to cooperate with cables having exterior dimensions within a second range, wherein the second range is different from the first range.

13. The cable management system of claim 12, wherein the second clamping surface of the keeper is formed on a first face of the keeper, and the third clamping surface is formed on a second face of the keeper that is different from the first face.

14. The cable management system of claim 13, wherein the first face of the keeper and the second face of the keeper are on opposite sides of the keeper.

15. The cable management system of claim 12, wherein the keeper is separable from the bolster, to be adjusted between:
   a first installation in which the second clamping surface of the keeper opposes the first clamping surface of the bolster, and
   a second installation in which the third clamping surface of the keeper opposes the first clamping surface of the bolster.

16. The cable management system of claim 12, comprising an anti-slip surface provided on at least one of the first clamping surface, the second clamping surface, or the third clamping surface.

17. The cable management system of claim 16, wherein the anti-slip surface comprises a particulate coating.

18. The cable management system of claim 12, wherein the second clamping surface comprises a first arcuate region having a first radius of curvature, and the third clamping surface comprises a second arcuate region having a second radius of curvature, and wherein the first radius of curvature is different from the second radius of curvature.

19. The cable management system of claim 12, wherein the second clamping surface has a first cross-sectional shape, the third clamping surface has a second cross-sectional shape, and the first cross-sectional shape is different from the second cross-sectional shape.

20. A clamp for engaging objects having different exterior dimensions, the clamp comprising:
   a bolster comprising a first clamping surface, wherein the first clamping surface comprises a first arcuate region having a first radius of curvature; and
   a keeper that is to be coupled to the bolster by a releasable fastener and adjusted through manipulation of the releasable fastener to establish a variable distance separating the keeper from the first clamping surface, wherein the keeper comprises:
      a second clamping surface comprising a second arcuate region having a second radius of curvature, and configured to extend at least partially about objects having an exterior dimension within a first range, and
      a third clamping surface comprising a third arcuate region having a third radius of curvature, different from the second radius of curvature, and configured to extend at least partially about objects having an exterior dimension within a second range, wherein
   at least one of the first arcuate region, the second arcuate region, or the third arcuate region comprises an anti-slip surface.

* * * * *